(12) United States Patent
Feher et al.

(10) Patent No.: US 12,092,036 B2
(45) Date of Patent: Sep. 17, 2024

(54) ALTERNATIVE FUEL FAST START SYSTEMS FOR GAS TURBINE ENGINES

(71) Applicant: General Electric Company, Schenectady, NY (US)

(72) Inventors: Peter Feher, Greenville, SC (US); Ilya A. Slobodyanskly, Greenville, SC (US)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 0 days.

(21) Appl. No.: 18/069,669

(22) Filed: Dec. 21, 2022

(65) Prior Publication Data

US 2024/0209790 A1     Jun. 27, 2024

(51) Int. Cl.
| | |
|---|---|
| *F02C 7/26* | (2006.01) |
| *F02C 7/224* | (2006.01) |
| *F02C 7/236* | (2006.01) |
| *F02C 9/40* | (2006.01) |

(52) U.S. Cl.
CPC .............. *F02C 7/26* (2013.01); *F02C 7/224* (2013.01); *F02C 7/236* (2013.01); *F02C 9/40* (2013.01); *F05D 2240/36* (2013.01); *F05D 2260/213* (2013.01); *F05D 2260/85* (2013.01)

(58) Field of Classification Search
CPC ...... F02C 3/20; F02C 3/22; F02C 6/14; F02C 7/224; F02C 7/26; F02C 7/40; F02C 9/40
See application file for complete search history.

(56) References Cited

U.S. PATENT DOCUMENTS

| | | | | |
|---|---|---|---|---|
| 3,935,849 | A * | 2/1976 | Mills ....................... | F02M 31/18 |
| | | | | 123/553 |
| 4,203,300 | A * | 5/1980 | Hanson ..................... | B01D 1/00 |
| | | | | 165/104.32 |
| 6,539,775 | B2 | 4/2003 | Driftmeier | |
| 7,089,745 | B2 | 8/2006 | Roby et al. | |
| 9,285,118 | B2 | 3/2016 | Neufeldt et al. | |
| 10,399,692 | B2 * | 9/2019 | Soriano ................... | F02C 7/224 |
| 10,718,266 | B2 * | 7/2020 | Lawson ................. | F02M 31/18 |

(Continued)

FOREIGN PATENT DOCUMENTS

| | | | | |
|---|---|---|---|---|
| CN | 113623073 A | * | 11/2021 | ................ F02C 3/22 |
| JP | 2008-128010 A | | 6/2008 | |
| KR | 10-0590962 B1 | | 6/2006 | |

OTHER PUBLICATIONS

International Search Report and Written Opinion, PCT/US2023/083339, dated Apr. 8, 2024 (11 pp.).

*Primary Examiner* — Alain Chau
(74) *Attorney, Agent, or Firm* — Eversheds Sutherland (US) LLP

(57) ABSTRACT

The present application provides an alternative fuel fast start system for a gas turbine engine with a combustor and a compressor. The alternative fuel fast start system may include an alternative liquid fuel, a thermal energy storage tank, and a vaporizer. The alternative liquid fuel is stored in the thermal energy storage tank under pressure such that releasing the alternative liquid fuel from the thermal energy storage tank vaporizes the alternative fuel. Upon start-up of the gas turbine engine, the thermal energy storage tank supplies the vaporized alternative fuel to the combustor until the vaporizer is operational. The alternative liquid fuel may be propane, ethanol, or methanol.

19 Claims, 4 Drawing Sheets

(56) References Cited

U.S. PATENT DOCUMENTS

| | | | |
|---|---|---|---|
| 10,989,117 B2* | 4/2021 | Roberge | F02C 3/22 |
| 11,168,620 B2* | 11/2021 | Kanei | F01D 15/10 |
| 11,199,327 B2 | 12/2021 | Lu et al. | |
| 11,629,642 B2* | 4/2023 | Lawson | F02C 3/24 |
| | | | 60/775 |
| 11,668,243 B2* | 6/2023 | Muldoon | F02C 7/262 |
| | | | 60/736 |
| 2005/0081535 A1 | 4/2005 | Engdahl | |
| 2007/0089423 A1 | 4/2007 | Norman et al. | |
| 2010/0126135 A1* | 5/2010 | Joshi | F02C 3/28 |
| | | | 60/39.12 |
| 2011/0116777 A1* | 5/2011 | Tiras | G01F 25/10 |
| | | | 73/861.351 |
| 2012/0090331 A1* | 4/2012 | Bilton | F23K 5/00 |
| | | | 60/734 |
| 2012/0285167 A1 | 11/2012 | Horek et al. | |
| 2014/0007585 A1* | 1/2014 | Liu | F02C 7/22 |
| | | | 60/776 |
| 2014/0130478 A1* | 5/2014 | Pemmi | F02C 3/22 |
| | | | 60/39.465 |
| 2014/0165572 A1* | 6/2014 | Pang | F01K 3/12 |
| | | | 60/736 |
| 2014/0318134 A1* | 10/2014 | Popovic | F02C 3/22 |
| | | | 60/734 |
| 2014/0318634 A1* | 10/2014 | Zhang | F16K 5/06 |
| | | | 137/12 |
| 2015/0300260 A1* | 10/2015 | Wollenweber | F02C 9/40 |
| | | | 60/39.12 |
| 2019/0368426 A1* | 12/2019 | Kanei | F02C 6/00 |
| 2019/0389593 A1* | 12/2019 | Emerson | B01D 53/265 |
| 2020/0088098 A1* | 3/2020 | Roberge | F02C 7/16 |
| 2021/0189965 A1* | 6/2021 | Lawson | F02C 7/264 |
| 2021/0207537 A1* | 7/2021 | Roberge | F02C 9/30 |
| 2022/0106053 A1* | 4/2022 | Snyder | B64D 33/10 |
| 2022/0194622 A1* | 6/2022 | Rambo | B64D 37/34 |
| 2022/0195927 A1* | 6/2022 | Rambo | F02C 7/232 |
| 2022/0381185 A1* | 12/2022 | Muldoon | F02C 7/277 |
| 2023/0092811 A1* | 3/2023 | Palmer | F02C 3/22 |
| | | | 60/39.281 |
| 2023/0122350 A1* | 4/2023 | Minas | F02C 7/224 |
| | | | 60/39.281 |
| 2023/0212983 A1* | 7/2023 | Sibilli | F02C 7/14 |
| | | | 60/730 |
| 2023/0323816 A1* | 10/2023 | Snyder | F28D 20/0034 |
| | | | 165/10 |

* cited by examiner

US 12,092,036 B2

ALTERNATIVE FUEL FAST START SYSTEMS FOR GAS TURBINE ENGINES

TECHNICAL FIELD

The present application and the resultant patent relate generally to gas turbine engines and more particularly relate to alternative fuel fast start systems and methods for gas turbine engines using a rapid release of hot pressurized alternative fuels from thermal storage.

BACKGROUND

Generally described, diesel fuel has been considered the traditional liquid fuel for gas turbine-driven power generation systems. Diesel fuel has a relatively low cost, is easy to store and handle, and has a high energy concentration (heating value). With the increased use of natural gas and supporting infrastructures, however, diesel fuel is now generally used a backup fuel rather than as the main fuel.

With current and future decarbonization objectives, there is a growing global need for alternatives to diesel fuel. Hydrogen has become the targeted primary fuel as a carbon-free energy source for the next generation of gas turbines. One of the goals in the development of hydrogen capable combustion systems is to eliminate the use of liquid fuel. The benefits of using only gaseous fuels are significant in reducing complexity, cost, and overall operability limitations.

The backup fuel for hydrogen capable combustion systems needs to meet several operational requirements. The fuel should be in liquid form such that it can be stored on site in large quantities in a cost-effective manner. The fuel should have as low a carbon content as possible. Further, the fuel should have favorable vaporization properties such that the fuel can be pressurized and vaporized for use in a gas turbine engine. The current focus with these requirements is on liquid propane gas (LPG), ethanol, methanol, and similar fuels.

Gas turbine engines in a simple cycle configuration are often used for "fast start" service. Such a "fast start" requires about ten minutes from cold start (notice) to base load. This fast start capability is a challenge for currently available vaporizer systems using propane, ethanol, methanol, and the like because these systems generally require much longer than a few minutes for vaporization and readiness for injecting fuel into the combustor of the gas turbine engine. Specifically, current systems may require hours for the vaporizer equipment to warm up and to begin fuel conditioning.

SUMMARY

The present application and the resultant patent thus provide an alternative fuel fast start system for a gas turbine engine with a combustor and a compressor. The alternative fuel fast start system may include an alternative liquid fuel, a thermal energy storage tank, and a vaporizer. The alternative liquid fuel is stored in the thermal energy storage tank under pressure such that releasing the alternative liquid fuel from the thermal energy storage tank vaporizes the alternative fuel. Upon start-up of the gas turbine engine, the thermal energy storage tank supplies the vaporized alternative fuel to the combustor until the vaporizer is operational.

The present application and the resultant patent further provide a method of fast start up of a gas turbine engine having a combustor and a compressor. The method may include the steps of storing a liquid fuel under pressure in a thermal energy storage tank, warming a heat exchange fluid in a heat recovery loop with a discharge from the compressor, warming a vaporizer with the heat exchange fluid, vaporizing the liquid fuel by releasing the pressure on the thermal energy storage tank, and flowing the vaporized fuel from the thermal energy storage tank to the combustor until the vaporizer has reached a predetermined temperature.

The present application and the resultant patent further provide a fast start system for a gas turbine engine with a combustor and a compressor. The fast start system may include a liquid propane fuel, a thermal energy storage tank, and a liquid bath vaporizer. The liquid propane fuel is stored in the thermal energy storage tank under pressure such that releasing the liquid propane fuel from the thermal energy storage tank vaporizes the liquid propane fuel into a vaporized propane gas fuel such that, upon start-up, the thermal energy storage tank supplies the vaporized propane gas fuel to the combustor until the liquid bath vaporizer is operational.

These and other features and improvements of this application and the resultant patent will become apparent to one of ordinary skill in the art upon review of the following detailed description when taken in conjunction with the several drawings and the appended claims.

DETAILED DESCRIPTION

Figure 1:
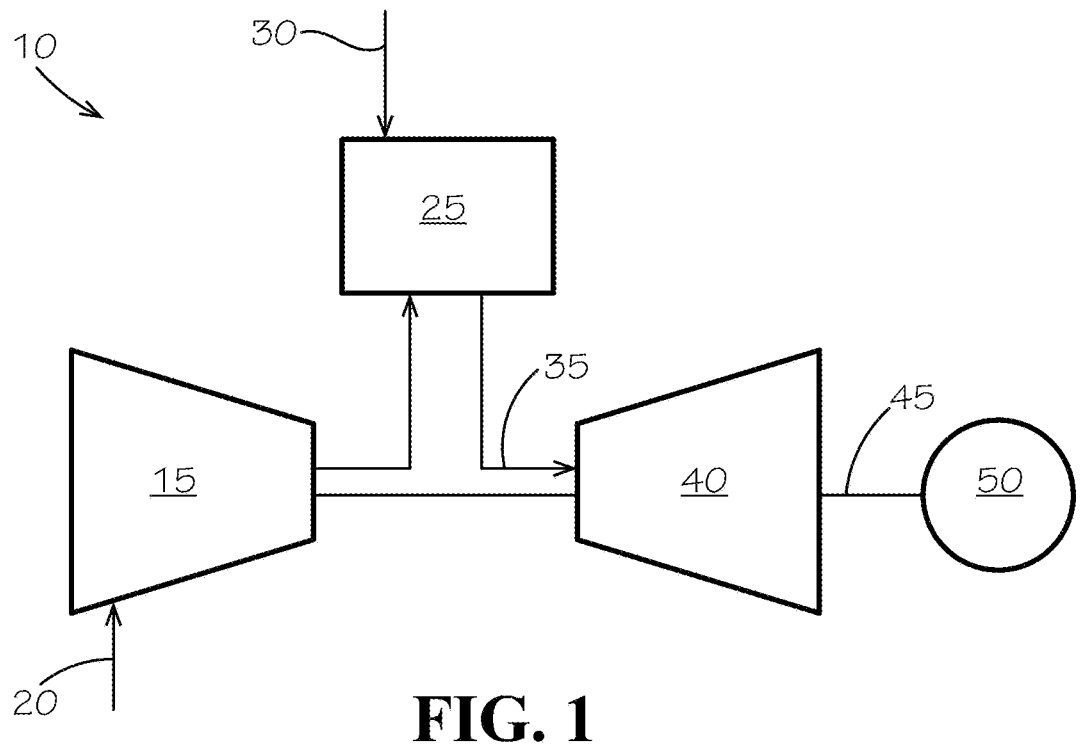
FIG. 1 is a schematic diagram of a gas turbine engine including a compressor, a combustor, a turbine, and an external load.

Referring now to the drawings, in which like numerals refer to like elements throughout the several views, FIG. 1 shows a schematic diagram of a gas turbine engine 10 as may be used herein. The gas turbine engine 10 may include a compressor 15. The compressor 15 compresses an incoming flow of air 20. The compressor 15 delivers the compressed flow of air 20 to a number of combustor cans 25. The combustor cans 25 mix the compressed flow of air 20 with a pressurized flow of fuel 30 and ignite the mixture to create a flow of hot combustion gases 35. Although only a single combustor can 25 is shown, the gas turbine engine 10 may include any number of combustor cans 25 positioned in a circumferential array and the like. Alternatively, the combustor 25 may be an annular combustor. The flow of combustion gases 35 is in turn delivered to a turbine 40. The flow of combustion gases 35 drives the turbine 40 to produce mechanical work. The mechanical work produced in the turbine 40 drives the compressor 15 via a rotor shaft 45 and an external load 50 such as an electrical generator and the like.

The gas turbine engine 10 may be any one of a number of different gas turbine engines offered by General Electric Company of Schenectady, New York, including, but not limited to, those such as a 7-series or a 9-series heavy duty gas turbine engine and the like and may be part of a simple cycle or a combined cycle power generation system. The gas turbine engine 10 may have different configurations and may use other types of components. Other types of gas turbine engines also may be used herein. Multiple gas turbine engines, other types of turbines, and other types of power generation equipment also may be used herein together.

Figure 3:
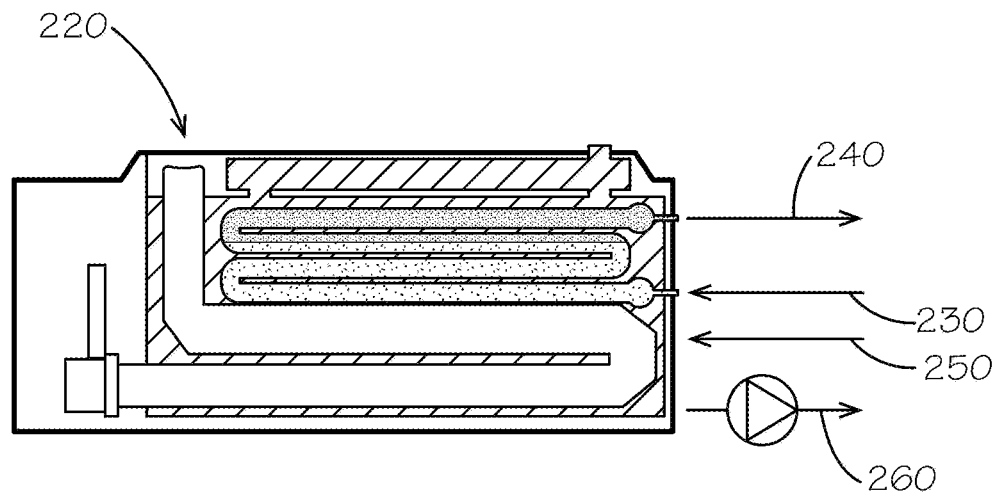
FIG. 3 is a schematic diagram of a liquid bath vaporizer that may be used with the alternative fuel fast start system of FIG. 2.
Figure 2:
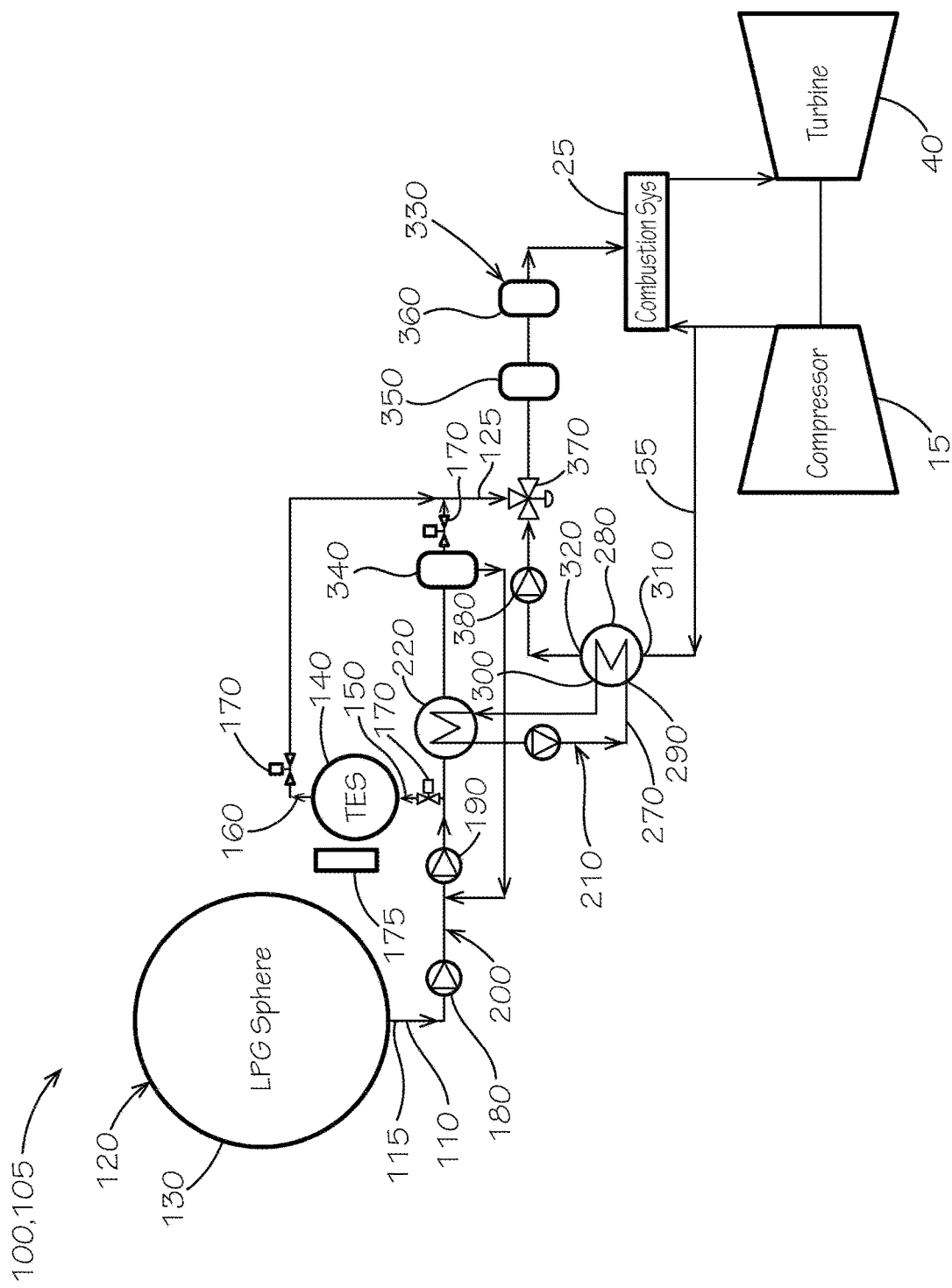
FIG. 2 is a schematic diagram of an alternative fuel fast start system as may be described herein.

FIGS. 2 and 3 show an alternative fuel fast start system 100 as may be described herein for use with the gas turbine engine 10 and the like. Specifically, a liquid propane fast start system 105 is shown in this example. The liquid propane fast start system 105 may vaporize a flow of liquid propane 110 into a flow of vaporized propane gas 125 for use in the combustor 25 during fast starts and the like of the gas turbine engine 10. Other types of alternative fuels 115 may be used herein.

The liquid propane fast start system 105 may include a liquid propane storage tank 120. The liquid propane storage tank 120 may include a volume of the liquid propane 110 therein. The liquid propane storage tank 120 may have any suitable size, shape, or configuration, including the form of a sphere 130. The liquid propane storage tank 120 may be insulated or non-insulated. Depending upon operational requirements, the liquid propane storage tank 120 may have a sufficient volume to fuel the gas turbine engine 10 for about 72 hours of backup operations at base load. Other components and other configurations may be used herein.

The liquid propane fast start system 105 may include a thermal energy storage tank 140. When charged, the thermal energy storage tank 140 may store a heated volume of the liquid propane 110 under pressure. The thermal energy storage tank 140 may be of conventional design and may have any suitable size, shape, or configuration. The thermal energy storage tank 140 may be insulated. The thermal energy storage tank 140 may have an entry port 150 and an exit port 160. One or more valves 170 may be positioned on either side of the thermal energy storage tank 140. The valves 170 may be conventional solenoid on and off valves and the like. The thermal energy storage tank 140 may have an electrical jockey-heater 175 and the like for stand-by heat losses. The heater 175 may be of conventional design. Other types of heating devices may be used herein.

The liquid propane storage tank 120 and the entry port 150 of the thermal energy storage tank 140 may be in communication via a forwarding pump 180 and a high-pressure pump 190 downstream of the forwarding pump 180. The forwarding pump 180 may be a conventional low net positive suction head (NPSH) pump and the like to provide a substantially laminar flow for the flow of the liquid propane 110. The forwarding pump 180 may have any suitable capacity. The high-pressure pump 190 likewise may be of conventional design and may have any suitable capacity. The high-pressure pump 190 pressurizes the flow of liquid propane 110 entering the thermal energy storage tank 140. Other components and other configurations may be used herein.

The liquid propane fast start system 105 may include a vaporization circuit 200 and an interconnected heat recovery loop 210. As is shown in FIG. 3, the vaporization circuit 200 may include a liquid bath vaporizer 220. The liquid bath vaporizer 220 may be a heat exchanger for exchanging heat between the flow of the liquid propane 110 and the heat recovery loop 210. The liquid bath vaporizer 220 may include a liquid propane entry port 230 and a vaporized propane exit port 240. Likewise, the liquid bath vaporizer 220 may have a vaporizer liquid heat entry port 250 and a vaporizer liquid heat exit port 260. A heat exchange fluid 270 may flow through the vaporizer liquid heat entry port 250 and the vaporizer liquid heat exit port 260. The heat exchange fluid 270 may be water, glycol, oils, and the like (including mixtures thereof). The flow of liquid propane 110 is heated and vaporized in the liquid bath vaporizer 220 by heat exchange with the heat exchange fluid 270 to the flow of the vaporized propane gas 125. Other components and other configurations may be used herein.

The heat recovery loop 210 may include an air cooler 280 in communication with the liquid bath vaporizer 220. The air cooler 280 may be a heat exchanger for exchanging heat between the flow of the heat exchange fluid 270 and a flow of compressor discharge air 55 from the compressor 15. The air cooler 280 may include a cooler liquid heat entry port 290 and a cooler liquid heat exit port 300 for the heat exchange fluid 270. Likewise, the air cooler 280 may have a compressor discharge entry port 310 and a compressor discharge exit port 320. The flow of compressor discharge air 55 heats the heat exchange fluid 270 for use in the liquid bath vaporizer 220. Other components and other configurations may be used herein.

The vaporization circuit 200 and the heat recovery loop 210 may have a number of fuel gas clean up components 330. The vaporization circuit 200 may include a knock-out drum 340. The knock-out drum 340 may be of conventional design and may remove condensed liquids and the like from the vaporized flow of the propane gas 125. In the illustrated embodiment, the knock-out drum 340 is downstream from the liquid bath vaporizer 220. The heat recovery loop 210 may include a scrubber 350 and any number of filters 360 such as coalescing filters and the like, which are located upstream of the combustor cans 25. The scrubber 350 and the filters 360 may be of conventional design and may remove impurities and liquid droplets from the flow of the vaporized propane gas 125.

The vaporization circuit 200 and the heat recovery loop 210 may meet at a gas/air mixer 370. The gas/air mixer 370 may be of conventional design and may mix the flow of the vaporized propane gas 125 and the flow of the compressor discharge air 55 before entry into the combustor 25. The gas/air mixer 370 may receive the vaporized propane gas 125 either from the thermal energy storage tank 140 or from the liquid bath vaporizer 220. One or more booster compressors 380 likewise may be used to boost the flow of the compressor discharge air 55. The booster compressors 380 may be conventional design. Other components and other configurations may be used herein.

In the charged condition, the thermal energy storage tank 140 may be filled with liquid propane 110 under pressure and heated. For example, the liquid propane 110 may be pressurized at approximately 600 psig and heated to the saturation temperature of about 210° Fahrenheit (about 98.9° Celsius) via the heater 175, via circulation through the liquid bath vaporizer 220 in the vaporization circuit 200, or otherwise. The thermal energy storage tank 140 then may be isolated with the respective valves 170 closed.

At the initiation of the cold start, the gas turbine engine 10 will start a cold acceleration cycle up to a partial speed, and the liquid bath vaporizer 220 may initiate a warmup cycle. Once the "ready to fire" signal is received, the booster compressor 380 will supply the compressor discharge air 55 and the thermal energy storage tank 140 will release the vaporized propane gas 125 through instant boil-off of the hot liquid and will supply the vaporized propane gas 125 to the gas/air mixer 370. After mixing and pressure reduction, the gas mixture may be significantly above its dewpoint condition.

As the pressure of the gas at the top of the thermal energy storage tank 140 drops below the saturation pressure, the latent heat of the liquid propane 110 rapidly causes a boil off in sufficient quantities. The thermal energy storage tank 140 is still isolated from the liquid propane storage tank 120, so for a considerable amount of time (15 to 25 minutes), the thermal energy storage tank 140 may provide the fuel supply to the gas turbine engine 10. As the stored liquid propane 110 in the thermal energy storage tank 140 is depleted, the pressure will decay at a certain rate until the pressure is not sufficient for the combustor 25. At that time, the valves 170 on the thermal energy storage tank 140 may be closed and the liquid bath vaporizer 220 begins to supply the fuel to the combustor 25. Likewise, once the compressed airflow through the air cooler 280 starts operating, the heat recovery loop 210 may be activated. The heat rejected from the flow of compressor discharge air 55 will be transferred to the liquid bath vaporizer 220. This process will help accelerate the warmup of the liquid bath vaporizer 220 to the predetermined operating temperature as well reduce the fuel consumption therein.

Once the liquid bath vaporizer 220 is warmed up and ready to take over the fuel supply, the liquid propane pumps 180, 190 will start the flow through the liquid bath vaporizer 220. The inlet valves 170 on the thermal energy storage tank 140 will open so as to fill the thermal energy storage tank 140 with the liquid propane 110 at ambient temperatures. Once the thermal energy storage tank 140 is filled, the inlet valves 170 may close and the electrical jockey heaters 175 inside the thermal energy storage tank 140 may gradually increase the temperature and pressure of the liquid propane 110 so as to charge the thermal energy storage tank 140.

The liquid propane fast start system 100 thus maintains the liquid propane 110 within the thermal energy storage tank 140 in an over-pressurized, heated state. The pressure in the thermal energy storage tank 140 may be significantly higher than the required gas turbine supply pressure. Given such, the pressure drop in the thermal energy storage tank 140 will create a rapid, almost instantaneous, boiloff of the liquid propane 110 in quantities sufficient for the start, ramp up, and continuous operation of the gas turbine engine 10 until the liquid bath vaporizer 220 can safely take over and operate in steady sate mode. Likewise, the heat recovery loop 210 connects the liquid bath vaporizer 220 and the air cooler 280 to reduce the fuel consumption of the liquid bath vaporizer 220 and to accelerate the warm-up in the fast start mode.

The liquid propane fast start system 100 thus may be applicable to gas turbine engines 10, where liquid fuel combustors are not available or not desirable, where liquid backup fuel capability is still required, and where fast start is also a requirement. As will be described below, although the alternative fuel fast start system 100 has been described primarily in the context of the liquid propane 110, the system 105 also may be applicable to other liquid fuels with relatively flat latent heat or phase-change curves (i.e., approximately similar bubble and dewpoints).

Figure 4:
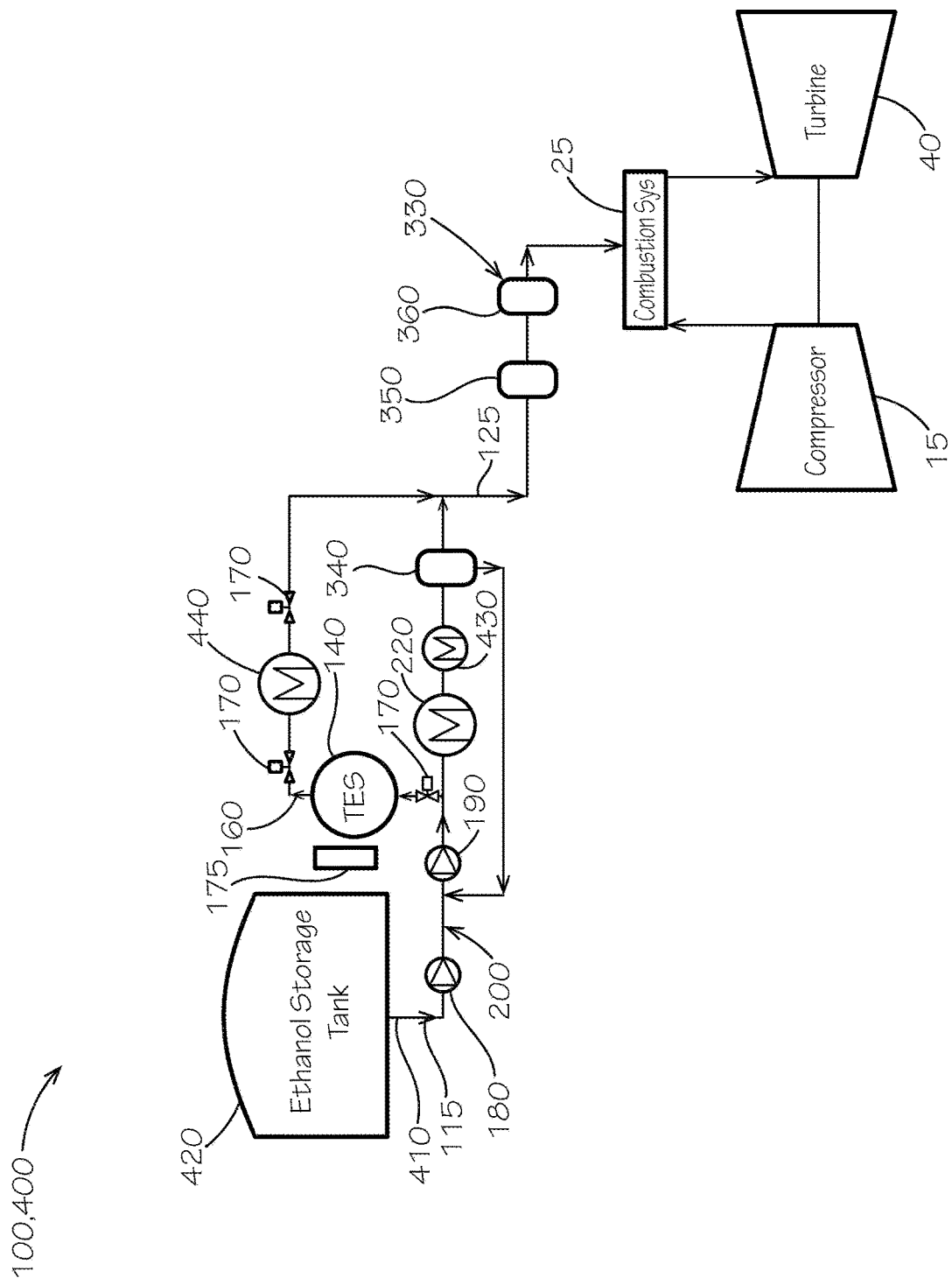
FIG. 4 is a schematic diagram of further embodiment of an alternative fuel fast start system as may be described herein.
Figure 5:
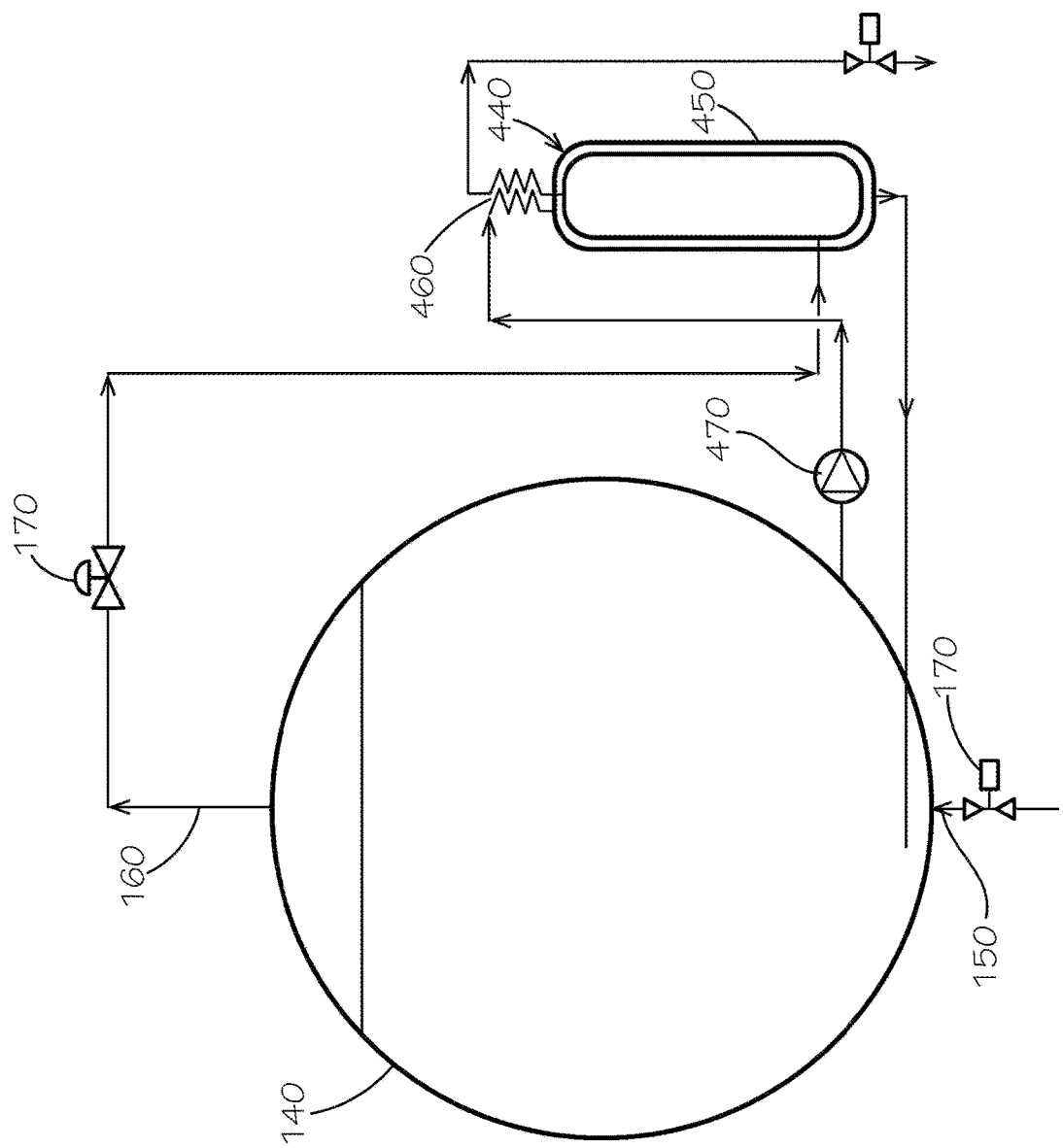
FIG. 5 is a schematic diagram of a passive superheater that may be used with the alternative fuel fast start system of FIG. 4.

For example, FIGS. 4 and 5 show an alternative fuel fast start system 100 as may be described herein for use with the gas turbine engine 10 and the like. Specifically, an ethanol fast start system 400 is shown in this example. The ethanol fast start system 400 may deliver a flow of ethanol 410 in vaporized form to the combustor 25 during fast starts and the like of the gas turbine engine 10. The ethanol fast start system 400 and similar systems are also applicable for use with methanol and similar types of fuels with a low number of carbon atoms. For the sake of simplicity, reference will made to the alternative system 400 as an "ethanol fast start system", but methanol or other similar fuels can be used in place of ethanol.

The ethanol fast start system 400 may include an ethanol storage tank 420. The ethanol storage tank 420 may include a volume of the ethanol 410 therein. The ethanol storage tank 420 may have any suitable size, shape, or configuration. The ethanol fast start system 400 may include the thermal energy storage tank 140. As described above, the thermal energy storage tank 140 may store a heated volume of the ethanol 410 under pressure. Likewise, the thermal storage tank 140 has the entry port 150, the exit port 160, and a number of the valves 170. The ethanol storage tank 420 and the entry port 150 of the thermal energy storage tank 140 may be in communication via the forwarding pump 180 and the high pressure pump 190. Other components and other configurations may be used herein.

The ethanol fast start system 400 may include the vaporization circuit 200 with the liquid bath vaporizer 220. The liquid bath vaporizer 220 may heat the flow of ethanol 410 via heat exchange with the heat recovery loop 210 as described above or via any other source of a heat exchange fluid 270. The vaporization circuit 200 also may include a liquid bath superheater 430. Similar to the liquid bath vaporizer 220, the liquid bath superheater 430 may be a heat exchanger in communication with the heat recovery loop 210 as described above or any other source of a heat exchange fluid 270. The liquid bath superheater 430 further raises the temperature of the flow of ethanol 410 to the minimum required superheat level. Other components and other configurations may be used herein.

The ethanol fast start system 400 may include a passive superheater and buffer 440 positioned between the thermal energy storage tank 140 and the combustor 25. As is shown in FIG. 5, the passive superheater and buffer 440 may include a storage tank 450 and a heat exchanger 460. A recirculation pump 470 may be used to recirculate the liquid ethanol 410 at the bottom of the thermal energy storage tank 140 through the heat exchanger 460 and the storage tank 450 of the passive superheater and buffer 440. Likewise, the heat exchanger 460 and the storage tank 450 act as a buffer during release of the vaporized ethanol 410 during startup with the heat exchanger 460 exchanging heat between the vapor and liquid streams of ethanol 410. Other components and other configurations may be used herein.

The ethanol fast start system 400 thus maintains the ethanol 410 within the thermal energy storage tank 140 in an over-pressurized state. The pressure in the thermal energy storage tank 140 may be significantly higher than the required gas turbine supply pressure. Given such, the pressure drop in the thermal energy storage tank 140 will create a rapid, almost instantaneous, boiloff of the ethanol 410 in quantities sufficient for the start, ramp up, and continuous operation of the gas turbine engine 10 until the liquid bath vaporizer 220 can safely take over and operate in steady sate mode.

It should be apparent that the foregoing relates only to certain embodiments of this application and resultant patent. Numerous changes and modifications may be made herein by one of ordinary skill in the art without departing from the general spirit and scope of the invention as defined by the following claims and the equivalents thereof.

Further aspects of the invention are provided by the subject matter of the following clauses:

1. An alternative fuel fast start system for a gas turbine engine with a combustor and a compressor, comprising an alternative liquid fuel; a thermal energy storage tank; wherein the alternative liquid fuel is stored in the thermal energy storage tank under pressure such that releasing the alternative liquid fuel from the thermal energy storage tank vaporizes the alternative liquid fuel; and a vaporizer; wherein upon start-up of the gas turbine engine, the thermal energy storage tank supplies the vaporized alternative fuel to the combustor until the vaporizer is operational.

2. The alternative fuel fast start system of clause 1, further comprising an alternative liquid fuel storage tank.

3. The alternative fuel fast start system of any preceding clause, wherein the thermal energy storage tank and the alternative liquid fuel storage tank are in communication via one or more pumps.

4. The alternative fuel fast start system of any preceding clause, wherein the vaporizer comprises a liquid bath vaporizer for transferring heat between the alternative liquid fuel and a heat exchange liquid.

5. The alternative fuel fast start system of any preceding clause, further comprising a heat recovery loop in communication with a discharge from the compressor.

6. The alternative fuel fast start system of any preceding clause, wherein the heat recovery loop comprises an air cooler in communication with the vaporizer.

7. The alternative fuel fast start system of any preceding clause, further comprising a gas/air mixer in communication with the vaporized alternative fuel from the thermal energy storage tank and the discharge from heat recovery loop.

8. The alternative fuel fast start system of any preceding clause, further comprising fuel gas clean up components in communication with the vaporized alternative fuel from the thermal energy storage tank.

9. The alternative fuel fast start system of any preceding clause, wherein the alternative fuel comprises propane.

10. The alternative fuel fast start system of any preceding clause, wherein the alternative fuel comprises ethanol or methanol.

11. The alternative fuel fast start system of any preceding clause, further comprising a liquid bath superheater downstream of the vaporizer.

12. The alternative fuel fast start system of any preceding clause, further comprising a passive superheater positioned between the thermal energy storage tank and the combustor.

13. The alternative fuel fast start system of any preceding clause, wherein the passive superheater comprises a storage tank and a heat exchanger.

14. The alternative fuel fast start system of any preceding clause, further comprising a recirculation pump positioned between the thermal energy storage tank and the passive superheater.

15. A method of fast start up of a gas turbine engine having a combustor and a compressor, comprising: storing a liquid fuel under pressure in a thermal energy storage tank; warming a heat exchange fluid in a heat recovery loop with a discharge from the compressor; warming a vaporizer with the heat exchange fluid; vaporizing the liquid fuel by releasing the pressure on the thermal energy storage tank; and flowing the vaporized fuel from the thermal energy storage tank to the combustor until the vaporizer has reached a predetermined temperature.

16. A fast start system for a gas turbine engine with a combustor and a compressor, comprising: a liquid propane fuel; a thermal energy storage tank; wherein the liquid propane fuel is stored in the thermal energy storage tank under pressure such that releasing the liquid propane fuel from the thermal energy storage tank vaporizes the liquid propane fuel to a propane gas fuel; and a liquid bath vaporizer; wherein upon start-up of the gas turbine engine, the thermal energy storage tank supplies the vaporized propane gas fuel to the combustor until the liquid bath vaporizer is operational.

17. The fast start system of any preceding clause, further comprising a liquid propane fuel storage tank.

18. The fast start system of any preceding clause, further comprising a heat recovery loop in communication with a discharge from the compressor.

19. The fast start system of any preceding clause, wherein the heat recovery loop comprises an air cooler in communication with the liquid bath vaporizer.

20. The fast start system of any preceding clause, further comprising a gas/air mixer in communication with the vaporized propane gas fuel from the thermal energy storage tank and the discharge from the heat recovery loop.

We claim:

1. An alternative fuel fast start system for a gas turbine engine with a combustor and a compressor, comprising:
    a fixed alternative liquid fuel storage tank with an alternative liquid fuel;
    a thermal energy storage tank in communication with the fixed alternative liquid fuel storage tank and with a heat source;
    wherein the alternative liquid fuel is stored in the thermal energy storage tank under pressure and heated such that releasing the alternative liquid fuel from the thermal energy storage tank instantly vaporizes the alternative fuel; and
    a vaporizer;
    wherein upon start-up of the gas turbine engine, the thermal energy storage tank supplies the vaporized alternative fuel to the combustor until the vaporizer is operational.

2. The alternative fuel fast start system of claim 1, wherein the alternative liquid fuel is stored in the alternative liquid fuel storage tank at ambient conditions.

3. The alternative fuel fast start system of claim 2, wherein the thermal energy storage tank and the alternative liquid fuel storage tank are in communication via one or more pumps.

4. The alternative fuel fast start system of claim 1, wherein the vaporizer comprises a liquid bath vaporizer for transferring heat between the alternative liquid fuel and a heat exchange liquid.

5. The alternative fuel fast start system of claim 1, further comprising a heat recovery loop in communication with a discharge from the compressor.

6. The alternative fuel fast start system of claim 5, wherein the heat recovery loop comprises an air cooler in communication with the vaporizer.

7. The alternative fuel fast start system of claim 1, further comprising fuel gas clean up components in communication with the vaporized alternative fuel from the thermal energy storage tank.

8. The alternative fuel fast start system of claim 1, wherein the alternative liquid fuel comprises propane.

9. The alternative fuel fast start system of claim 1, wherein the alternative liquid fuel comprises ethanol or methanol.

10. The alternative fuel fast start system of claim 9, further comprising a liquid bath superheater downstream of the vaporizer.

11. The alternative fuel fast start system of claim 9, further comprising a passive superheater positioned between the thermal energy storage tank and the combustor.

12. The alternative fuel fast start system of claim 11, wherein the passive superheater comprises a storage tank and a heat exchanger.

13. The alternative fuel fast start system of claim 11, further comprising a recirculation pump positioned between the thermal energy storage tank and the passive superheater.

14. The alternative fuel fast start system of claim 1, wherein the heat source comprises an electrical heater.

15. An alternative fuel fast start system for a gas turbine engine with a combustor and a compressor, comprising:
  an alternative liquid fuel;
  a thermal energy storage tank;
  wherein the alternative liquid fuel is stored in the thermal energy storage tank under pressure and elevated temperature such that releasing the alternative liquid fuel from the thermal energy storage tank instantly vaporizes the alternative fuel; and
  a vaporizer;
  wherein upon start-up of the gas turbine engine, the thermal energy storage tank supplies the vaporized alternative fuel to the combustor until the vaporizer is operational;
  further comprising a heat recovery loop in communication with air discharged from the compressor and a gas/air mixer in communication with the vaporized alternative fuel from the thermal energy storage tank and the compressor discharge air from the heat recovery loop.

16. A method of fast start up of a gas turbine engine having a combustor and a compressor, comprising:
  storing a volume of liquid fuel under pressure in a thermal energy storage tank;
  heating the volume of liquid fuel in the thermal energy storage tank with a heat source;
  warming a heat exchange fluid in a heat recovery loop with a discharge from the compressor;
  warming a vaporizer with the heat exchange fluid;
  instantly vaporizing the liquid fuel by releasing the pressure on the thermal energy storage tank; and
  flowing the vaporized fuel from the thermal energy storage tank to the combustor until the vaporizer has reached a predetermined temperature.

17. A fast start system for a gas turbine engine with a combustor and a compressor, comprising:
  a liquid propane fuel;
  a thermal energy storage tank;
  wherein the liquid propane fuel is stored in the thermal energy storage tank under pressure such that releasing the liquid propane fuel from the thermal energy storage tank vaporizes the liquid propane fuel to a vaporized propane gas fuel;
  a liquid bath vaporizer;
  a heat recovery loop in communication with air discharged from the compressor; and
  a gas/air mixer in communication with the vaporized propane gas fuel from the thermal energy storage tank and the compressor discharge air from the heat recovery loop;
  wherein upon start-up of the gas turbine engine, the thermal energy storage tank instantly supplies the vaporized propane gas fuel to the combustor until the liquid bath vaporizer is operational.

18. The fast start system of claim 17, further comprising a liquid propane fuel storage tank.

19. The fast start system of claim 17, wherein the heat recovery loop comprises an air cooler in communication with the liquid bath vaporizer.

* * * * *